UNITED STATES PATENT OFFICE.

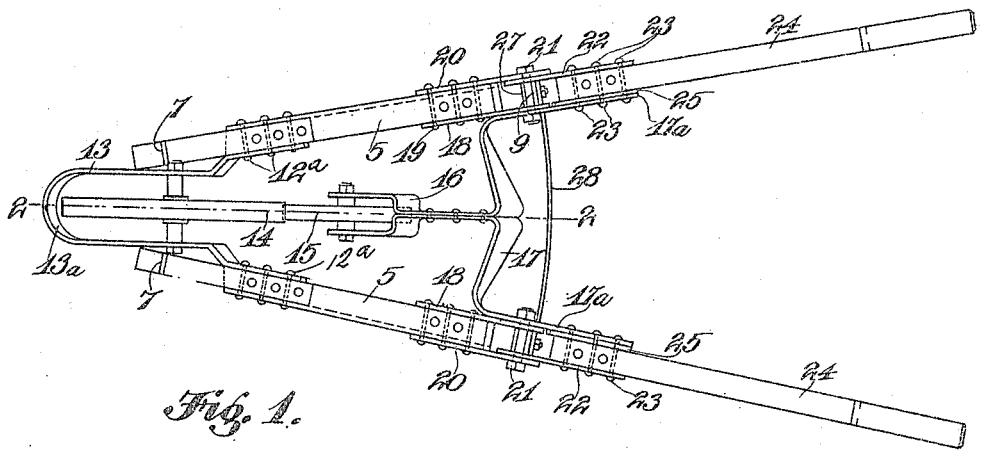

RICHARD W. BAYLEY, OF RIVERSIDE, ILLINOIS.

WHEELBARROW.

1,255,128.     Specification of Letters Patent.    Patented Feb. 5, 1918.

Application filed March 3, 1917. Serial No. 152,374.

*To all whom it may concern:*

Be it known that I, RICHARD W. BAYLEY, a citizen of the United States, residing at Riverside, in the county of Cook and State of Illinois, have invented new and useful Improvements in Wheelbarrows, of which the following is a specification.

This invention relates to wheelbarrows and has for its object to provide an appliance of this kind with a means whereby the entire load may be borne by the barrow and taken off the operator, this being effected by an auxiliary wheel on which the rear end of the barrow is supported, said auxiliary wheel being adjustable so that it may be placed into and out of operative position.

The invention consists in a novel combination and arrangement of parts to be hereinafter described and claimed, and in order that the same may be better understood, reference is had to the accompanying drawing forming a part of this specification.

In the drawing—

Figure 1 is a plan view of the appliance partly in section on the line 1—1 of Fig. 2, and Fig. 2 is a longitudinal section on the line 2—2 of Fig. 1.

Referring specifically to the drawing the frame of the barrow so composed of two divergent wooden side rails 5 carrying a bed 6 which is supported by flat curved spring bars 7 which are continued rearward to form a seat 8 for the bed, and then extend downward as shown at 9 to form a supporting stand or prop, from which latter they extend forward as shown at 10 and are fastened to the bottom of the rails 5 as shown at 12. The other ends of the bars are fastened to the top of the rails, from which latter they extend upward in a curve and then rearward to form the seat 8 for the bed.

To the inner face of the rails 5, at their forward ends, are fastened, as shown at 12$^a$, the branches 13 of a yoke 13$^a$ supporting the front wheel 14 and forming a guard therefor.

The auxiliary wheel of the barrow is shown at 15, the same being located behind the front or main wheel 14. This auxiliary wheel is supported by a fork 16 having at its upper end two laterally extending wings 17 terminating in rearward extensions 17$^a$. The wings 17 extend in opposite directions far enough to bring the extensions 17$^a$ close to the inner sides of the rails 5, said sides being provided with reinforcing plates 18 which are secured to the rear ends of the rails by bolts or other suitable fasteners 19. Similar plates 20 are secured by the same bolts on the outer sides of the rails.

Each pair of plates 18 and 20 extend rearwardly from the rails 5 and their projecting ends carry a pivot bolt 21 passing therethrough, and also through the extension 17$^a$ of the fork which supports the wheel 15, thereby providing a pivotal support for the supporting means of said wheel. Each pivot bolt also passes through a plate 22 fastened, as shown at 23, to the outer face of a handle 24, the fasteners 23 also securing on the inner face of said handle a plate 25 and the fork extension 17$^a$. Thus the handles are fastened to the fork which supports the wheel 15, and the fork may be swung about the pivot bolts 21, the swing being in a vertical plane.

It will be noted that the rear end plates 18 are cut on a slant to act as a stop and limit the upward swing of the handles 24 by the forward ends of the plates 25 coming in contact therewith.

The parts 9 have jaw plates 27 for attachment to the pivot bolts 21, and they are reinforced by a cross bar 28.

The operation of the auxiliary wheel 15 is as follows:

When the handles 24 are swung upward, the wheel 15 swings downward and rearward, resulting in the body of the barrow being elevated to take the props 9 off the ground. The load is now supported on the wheels 14 and 15 and taken off the handles 24, so that the barrow can be rolled about with very little effort as the operator has no lifting to do but needs only to push the barrow. The hereinbefore described operation will be understood from an inspection of Fig. 2 in which the auxiliary wheel is shown dotted in operative position. When the barrow is being loaded, the auxiliary wheel is swung forward as shown in full lines, the rear end of the barrow being then supported by the props 9. In order to facilitate making a short turn, the operator lifts the rear end of the barrow higher until the auxiliary wheel is off the ground, and then turns in the ordinary manner with the load on the front wheel 14.

The preferred embodiment of the invention has been shown and described, but it will be understood that various changes and modifications may be made without departure from the spirit and scope of the invention as claimed hereinafter. Thus, the appliance may be fitted to various other types of vehicles and one or two auxiliary wheels may be used.

I claim:—

1. A wheelbarrow comprising a frame, a bed carried by the frame, a wheel supporting the forward end of the frame, an auxiliary wheel behind the first mentioned wheel, a support for the auxiliary wheel pivoted to the aforesaid frame to swing in a vertical plane, and handles connected to said support.

2. A wheelbarrow comprising a frame, a bed carried by the frame, a wheel supporting the forward end of the frame, an auxiliary wheel behind the first mentioned wheel, a support for the auxiliary wheel pivoted to the aforesaid frame to swing in a vertical plane, handles connected to said support, and means for limiting the upward swing of the handles.

3. A wheelbarrow comprising a frame having side rails, a bed carried by the side rails, a wheel supporting the forward end of the frame, an auxiliary wheel behind the first mentioned wheel, a support for the auxiliary wheel having lateral extensions which are pivotally connected to the side rails to permit the support to swing in a vertical plane, and handles connected to said extensions.

4. A wheelbarrow comprising a frame, handles pivoted to said frame to swing in a vertical plane, a bed carried by the frame, a wheel supporting the forward end of the frame, and an auxiliary wheel at the rear portion of the frame connected to the aforesaid handles to swing therewith.

In testimony whereof I affix my signature.

RICHARD W. BAYLEY.

Copies of this patent may be obtained for five cents each, by addressing the "Commissioner of Patents, Washington, D. C."